US010690509B2

(12) United States Patent
Kassner et al.

(10) Patent No.: US 10,690,509 B2
(45) Date of Patent: Jun. 23, 2020

(54) DISPLAY SYSTEM AND METHOD FOR OPERATING A DISPLAY SYSTEM IN A TRANSPORTATION VEHICLE HAVING AT LEAST ONE FIRST AND ONE SECOND DISPLAY SURFACE (71) Applicant: VOLKSWAGEN AKTIENGESELLSCHAFT, Wolfsburg (DE)

(72) Inventors: Astrid Kassner, Berlin (DE); Thomas Meyer, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 5 days.

(21) Appl. No.: 16/064,014

(22) PCT Filed: Dec. 20, 2016

(86) PCT No.: PCT/EP2016/082028
§ 371 (c)(1),
(2) Date: Jun. 20, 2018

(87) PCT Pub. No.: WO2017/108860
PCT Pub. Date: Jun. 29, 2017

(65) Prior Publication Data
US 2019/0003850 A1    Jan. 3, 2019

(30) Foreign Application Priority Data
Dec. 22, 2015    (DE) .................. 10 2015 122 599

(51) Int. Cl.
*G01C 21/36*    (2006.01)
*G06F 16/9537*    (2019.01)
(Continued)

(52) U.S. Cl.
CPC ...... *G01C 21/3676* (2013.01); *G01C 21/3484* (2013.01); *G01C 21/3605* (2013.01);
(Continued)

(58) Field of Classification Search
CPC ............ G01C 21/3676; G01C 21/3492; G01C 21/3614; G01C 21/3626; G01C 21/3632;
(Continued)

(56) References Cited

U.S. PATENT DOCUMENTS

| 2003/0100976 | A1* | 5/2003 | Watanabe | G01C 21/3688 |
| | | | | 701/1 |
| 2008/0147321 | A1* | 6/2008 | Howard | G01C 21/367 |
| | | | | 701/431 |
| 2012/0072109 | A1* | 3/2012 | Waite | B60K 35/00 |
| | | | | 701/431 |

FOREIGN PATENT DOCUMENTS

| DE | 102007018073 A1 | 10/2008 | |
| EP | 1128261 A2 * | 8/2001 | ........... G06F 3/1431 |
| EP | 1308695 A1 | 5/2003 | |

OTHER PUBLICATIONS

Machine Translation of EP1128261A2 (Year: 2001).*
(Continued)

*Primary Examiner* — Anne Marie Antonucci
*Assistant Examiner* — Andrew J Cromer
(74) *Attorney, Agent, or Firm* — Barnes & Thornburg LLP (57)    ABSTRACT A method for operating a display system in a transportation vehicle having at least one first display surface and one second display surface, wherein the display surfaces are spaced apart from one another and the display system has a first and a second operating mode. Navigation data are acquired and a map display is generated based on the acquired navigation data, wherein the map display has a current position of the transportation vehicle. Display data (Continued)

for at least one first component display and a second component display are generated based on the map display, wherein the first component display is displayed by the first display surface and the second component display is displayed by the second display surface. The first component display has a first map excerpt, and the second component display has a second map excerpt. Also disclosed is a display system in a transportation vehicle.

15 Claims, 3 Drawing Sheets

(51) Int. Cl.
*G06F 16/29* (2019.01)
*G01C 21/34* (2006.01)

(52) U.S. Cl.
CPC ....... *G01C 21/367* (2013.01); *G01C 21/3638* (2013.01); *G01C 21/3688* (2013.01); *G01C 21/3697* (2013.01); *G06F 16/29* (2019.01); *G06F 16/9537* (2019.01)

(58) Field of Classification Search
CPC ............ G01C 21/3635; G01C 21/3638; G01C 21/3661; G01C 21/3664; G01C 21/3667; G01C 21/3697; G06F 16/29
See application file for complete search history.

(56) References Cited

OTHER PUBLICATIONS

Search Report for International Patent Application No. PCT/EP2016/082028; dated Mar. 23, 2017.
International Preliminary Report on Patentability for International Patent Application No. PCT/EP2016/082028; dated Jun. 26, 2018.

* cited by examiner

DISPLAY SYSTEM AND METHOD FOR OPERATING A DISPLAY SYSTEM IN A TRANSPORTATION VEHICLE HAVING AT LEAST ONE FIRST AND ONE SECOND DISPLAY SURFACE

PRIORITY CLAIM

This patent application is a U.S. National Phase of International Patent Application No. PCT/EP2016/082028, filed 20 Dec. 2016, which claims priority to German Patent Application No. 10 2015 122 599.9, filed 22 Dec. 2015, the disclosures of which are incorporated herein by reference in their entireties.

SUMMARY

Illustrative embodiments relate to a method for operating a display system in a transportation vehicle having at least one first and one second display surface. Illustrative embodiments also relate to a display system in a transportation vehicle.

BRIEF DESCRIPTION OF THE DRAWINGS

Disclosed embodiments will now be described with reference to the drawings.

DETAILED DESCRIPTION

In modern vehicles, in particular, in transportation vehicles, a large number of devices are provided that can be operated electronically or that generate output data that may be output through the use of electronic display apparatuses. Screens are used for this purpose. Display apparatuses which conventionally have analog implementation, can furthermore be replaced by electronic displays. As a result of this, a plurality of screens are frequently used in one transportation vehicle. It is important here that information displayed on the screens can be comprehended quickly and easily. This is of importance when the driver should comprehend the information but divert as little attention as possible from traffic events. The aim is to achieve a uniform appearance for the various displays in the transportation vehicle.

Disclosed embodiments provide a display system and a method for operating a display system wherein a particularly easy, fast comprehension of the information on offer is enabled.

In the disclosed method for operating a display system in a transportation vehicle having at least one first display surface and one second display surface, the display surfaces are arranged spaced apart from one another, and the display system has a first and a second operating mode. In the method, navigation data are acquired, and a map display is generated on the basis of the acquired navigation data, wherein the map display comprises a current position of the transportation vehicle. Display data for at least one first component display and second component display are generated on the basis of the map display, wherein the first component display is displayed by the first display surface and the second component display is displayed by the second display surface. In this context, the first component display comprises a first map excerpt, and the second component display comprises a second map excerpt. The first and the second map excerpts here comprise different excerpts from the map display. The entirety of the two map excerpts form a coherent representation of data of the map display, wherein the first and the second map excerpts have a geographical relationship with one another. The geographical relationship is determined on the basis of the relative arrangement of the first display surface to the second display surface. Depending on the operating mode of the display system, one of the at least two display surfaces is determined, and the map excerpt of the component display that is displayed by the determined display surface is formed such that the map excerpt includes the current position of the transportation vehicle.

A display with coherent contents for two display surfaces of the display system is generated by the disclosed method. The coherency of the contents consists in an appropriate generation of the map excerpts shown by the two display surfaces, wherein the arrangement of the display surfaces in the transportation vehicle reflects the geographical relationship of the displayed map excerpts to one another.

One display surface can, for example, be arranged to the right of the other display surface. In this example, the choice of the displayed map excerpts is done, for example, such that the map excerpt displayed to the right is adjacent to a right-hand edge of the map excerpt output by the display surface on the left. The map excerpts can, moreover, overlap, wherein elements of the map display are repeated in an edge region, perhaps at the right-hand edge of the left-hand display surface and at the left-hand edge of the right-hand display surface.

It is not necessary here for there to be an exact equivalence between the geographical relationship of the map excerpts and the relative arrangement of the display surfaces. The display surfaces are, for example, arranged spaced apart from one another, wherein this physical spacing is not reflected by the geographical relationship of the map excerpts. The entirety of the map excerpts forms a coherent representation of data of the map display; the map excerpts are thus not to be understood as independent excerpts of the map display disconnected from one another.

The geographical relationship of the map excerpts to one another can remain unchanged, even when the map excerpts are generated afresh, for example, when the transportation vehicle moves and a new region of the map display should be displayed. The movement of the transportation vehicle can also be traced; for example, the map display can reproduce a rotation of the movement of direction of the transportation vehicle, and the map excerpts can thereby be determined again, while their geographical relationship to one another remains constant.

The current position of the transportation vehicle is also displayed, and this display is assigned to a particular display surface. The assignment is made on the basis of the operating mode, so that the attention of the user can be directed in this way. That is to say that the map excerpt that includes the current position of the transportation vehicle is typically of significance to the user. For example, orientation points in the surroundings of the current position of the transportation vehicle, or such positions at which the journey of the transportation vehicle must be modified for correct route guidance, are displayed. This calls for attention on the part of the driver of the transportation vehicle, so that it can frequently be assumed that his attention is given to the display surface that is outputting the current position of the transportation vehicle.

In an exemplary embodiment of the disclosed method, an operating mode change signal is detected and the first and the second component displays are updated on the basis of the operating mode change signal. The display can be adapted to external conditions, such as a driving situation.

In a further development, the updated component displays are formed such that the current position of the transportation vehicle is displayed by the display surface other than the one that was determined first. It is possible to switch between different cases on the basis of the operating mode change signal, wherein important items of information, in particular, the current position of the transportation vehicle, are displayed in each case by the one or other display surface.

In a further development, the operating mode change signal is detected on the basis of a user input, wherein the user input comprises an actuation of an operating element or a gesture. It is possible thereby to switch between the different operating modes in response to the wish of the user.

"Gesture" here refers to a particular position of the hand of a user or a particular movement that is executed by the hand of the user. A different actuation object, such as for example, a pen, can also be used instead of the hand of the user. The gesture can be formed according to a manner known per se. A pointing gesture or a swiping gesture can, for example, be provided. Gestures can, further, be used that are known from everyday use, for example, hand rotations, gripping gestures and combinations of pluralities of such gestures which may be carried out briefly immediately after one another. The gestures are performed in a detection space. A gesture can, for example, be carried out in a space in front of one of the display surfaces. The gesture can, furthermore, be made while simultaneously touching a touch-sensitive surface, such as wiping with the hand over a touch-sensitive surface of a touchscreen. A particularly easy and intuitive input facility for controlling the display content in the display region or of the associated devices is made available to the user through the control by gestures.

The user input can, alternatively or in addition, comprise a voice input or an actuation of an actuation element.

In a further design, the operating mode change signal is generated automatically on the basis of driving parameters. The operating mode can thereby be adapted to the current driving situation. The changeover in this case does not require any action from the user, so that demand for the attention of the user is not so strong.

The driving parameters can, for example, comprise a speed, an acceleration, a direction of travel, a position and/or further parameters of the transportation vehicle and of the movement of the transportation vehicle. Data of a navigation device can, further, be captured as driving parameters, wherein the data of the navigation device can, for example, comprise driving instructions. It is thus possible, for example, to detect when the next driving instruction should be output and executed. If such a driving instruction should not be carried out until a point in time significantly later than the present, it can, for example, typically be assumed that the route guidance is demanding little attention from the driver, and that therefore the display surface through which the current position of the transportation vehicle is displayed can be changed.

In a further development, application data are furthermore output through the at least two display surfaces, wherein the application data that is output is formed depending on the operating mode of the display system. The display surfaces can thereby be used to display output data from other devices of the transportation vehicle in addition to the map excerpts.

It is possible to determine on the basis of the operating mode which application data from which devices and applications of the transportation vehicle should be output. Which of the display surfaces that is indicating the component display with the current position of the transportation vehicle can be taken into account here. On the assumption that the attention of the user is given to the display surface that shows the current position of the transportation vehicle, the choice of the application data displayed can also be carried out with reference to the attention of the user.

In an exemplary embodiment of the disclosed method, the application data comprise a driving instruction. The driving instruction is generated by a navigation device of the transportation vehicle. An output of concrete instructions for driving maneuvers that are required to drive the transportation vehicle along a planned route can be given through this.

Typically in this context there is a close relationship between the contents of the map display and the driving instructions, where the former aids the orientation on the route and in the surroundings of the route, and the latter comprise concrete instructions for action for guidance of the transportation vehicle.

The operating modes of the display system can comprise a driving mode and a journey mode. The driving mode can here be defined in some such way that a component display outputs a particularly large amount of information for driving along the route. This component display can comprise the current position of the transportation vehicle and driving instructions. At the same time, the other component display can display a map excerpt in the periphery of the current position of the transportation vehicle, while application data of general interest, such as, for example, media, news, transportation vehicle data and more, is displayed at the same time. A reduced operation of the displayed applications through display windows within the component display can, furthermore, be carried out. A call to a more comprehensive operation can furthermore be provided.

The journey mode can, on the other hand, be configured such that the current position of the transportation vehicle is displayed on the other display surface, together with application data whose content is associated with the route being travelled. On the first display surface, on which the current position is displayed in the driving mode, the map excerpt displayed there can in the journey mode comprise the periphery of the current position of the transportation vehicle. An output of driving instructions can, for example, also take place here.

In one development, the first and second map excerpts are further determined depending on parameters of the movement of the transportation vehicle. Through this it is possible to take the way in which the transportation vehicle is moving into account.

A scale, a magnification factor, a direction of view and/or a measure for the degree of detail displayed for the map excerpts can be adjusted. The map excerpts can here depend on parameters of the movement of the transportation vehicle, for example, on a speed, an acceleration, a direction of movement, a position and/or previous values of movement parameters. It is possible on the basis of past values of movement parameters to detect whether many driving maneuvers are carried out in the present driving situation. Parameters of the movement of the transportation vehicle in a broad sense can here also refer to data of a navigation device, it being possible to take into account whether new driving instructions should be output within a short time, and driving maneuvers are therefore to be carried out. For example, it is possible if a high speed of the transportation vehicle is detected, for at least one map excerpt to be displayed at a higher or lower scale to permit a better orientation of the driver. It is furthermore possible in this way to affect how many details a map excerpt comprises, wherein more attention is typically required to comprehend many details than few details.

In a development, the map display comprises a representation of a route, wherein the representation of the route comprises an elongated graphical element starting from the current position of the transportation vehicle. In this way it is possible to illustrate the planned route along which the transportation vehicle should move. The orientation within the display is therefore made easier. The display of the route can here be made according to methods known per se; for example, a path along which the transportation vehicle should be driven can be marked by a changed color or other graphical emphasis over other parts. It is further possible for a "path envelope" to be displayed, in which a physically appearing marking is displayed along the route.

In one development, the map display comprises a two-dimensional or three-dimensional display. A particularly clear and aesthetic display can be generated in this way. The display can here be prepared according to methods known per se, wherein the same kind of display is used for both display surfaces. A changeover between two-dimensional and three-dimensional display can further be carried out depending on the operating mode.

The disclosed display system in a transportation vehicle comprises at least a first and a second display surface, wherein the display surfaces are arranged spaced apart from one another and the display system has a first and a second operating mode. It further comprises a navigation device through which navigation data can be captured and a map display can be generated on the basis of the captured navigation data, wherein the map display includes a current position of the transportation vehicle. It further comprises a control unit through which, on the basis of the map display, display data for at least a first and a second component display can be generated, wherein the first component display can be displayed by the first display surface and the second component display can be displayed by the second display surface. In this context, the first component display comprises a first map excerpt, and the second component display comprises a second map excerpt. The first and the second map excerpts here comprise different excerpts from the map display. The entirety of the two map excerpts form a coherent representation of data of the map display, wherein the first and the second map excerpts have a geographical relationship with one another. The geographical relationship can here be determined on the basis of the relative arrangement of the first to the second display surface. Further, depending on the operating mode of the display system, one of the at least two display surfaces can be determined, and the map excerpt of the component display that can be displayed by the determined display surface is formed such that the map excerpt includes the current position of the transportation vehicle. The display system is designed to implement the above-described method. The disclosed display system thus has the same benefits as the disclosed method.

In an exemplary embodiment of the disclosed display system, application data can be generated by a computing unit, and the application data can be output through the at least two display surfaces depending on the operating mode. In this way information from further applications can be output, wherein a changeover between different displays is provided on the basis of the operating mode.

In a further development, the first and the second display surfaces are arranged in fixed positions in the transportation vehicle. In this way the relative arrangement between the first and the second display surfaces has a fixed definition. The geographical relationship between the map excerpts can in this way also easily be determined.

At least one display surface can further be implemented as a mobile unit or can be repositioned within the transportation vehicle. In this case, the arrangement of the display surfaces to one another can be determined anew, or a hypothetical fixed arrangement of the display surfaces can be assumed.

In one further development, the display surfaces are arranged laterally in relation to one another. In this way the impression of a coherent display extending over a greater width can be generated through the linked content of the two display surfaces. A direction which extends essentially parallel to a horizontal plane and essentially perpendicular to the direction of travel of the transportation vehicle is here to be considered as a lateral direction. The display surfaces are not here necessarily arranged next to one another laterally at the same level, but a height offset can be present.

When determining the geographical relationship of the map excerpts to one another, it is possible for only one part of the relative arrangement of the display surfaces to be taken into account, so that it is, for example, possible to ignore the fact that the display surfaces are arranged at different heights.

In one development, the display surfaces are comprised of a center display and infotainment screen and/or an instrument cluster. At least one of the display surfaces is arranged at an instrument panel or a central console of the transportation vehicle. Through this, the arrangement of the display surfaces can be done such that the driver for whom the map display is typically of great interest, can quickly and easily comprehend information about the geographical surroundings and the route guidance.

Figure 1:
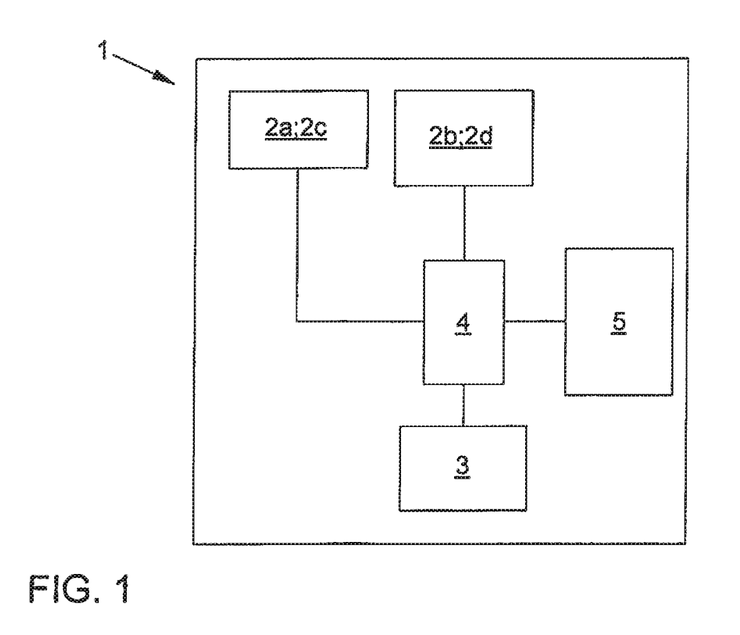
FIG. 1 shows an exemplary embodiment of the disclosed display system.

An exemplary embodiment of the disclosed display system is explained with reference to FIG. 1.

A transportation vehicle 1 comprises a first display surface 2a and a second display surface 2b. The display surfaces 2a, 2b are coupled to a control unit 4. The control unit 4 is further coupled to a computing unit 5 and a navigation device 3.

In the illustrated exemplary embodiment, the second display surface 2b is arranged laterally to the right of the first display surface 2a at the instrument panel of the transportation vehicle 1. In this example, the first display surface 2a is part of the instrument cluster of the transportation vehicle 1, and the second display surface is part of a center display such as is typically used for the output of contents of an infotainment system.

An exemplary embodiment of the disclosed method is explained with reference to the FIGS. 1, 2A and 2B. The exemplary embodiment of the disclosed system explained above with reference to FIG. 1 is assumed here.

Navigation data are captured by the navigation device 3 in a first operation. These comprise data of a road network for the transportation vehicle 1 as well as data for a planned route for the transportation vehicle 1 along the road network. The navigation data further comprise driving instructions, in other words instructions for driving the transportation vehicle 1 to permit driving along the planned route. The navigation data further comprise a current position of the transportation vehicle 1. On the basis of the acquired navigation data, a map display is generated by the computing unit 5, which includes a current position of the transportation vehicle 1.

The map display is here generated according to methods known per se, and comprises geographical data, relating to the road network, a display of the planned route, and a graphical display of the position of the transportation vehicle 1 relative to the road network. The display of the position of the transportation vehicle 1 can, for example, be made by a graphical element which has a direction in which the transportation vehicle 1 is moving, for example, an arrow. The map display can here be generated in a two-dimensional or three-dimensional form.

In a further operation, display data for two component displays are generated, wherein a first of the two component displays is displayed by the first display surface 2*a* and a second component display is displayed by the second display surface 2*b*. The component displays comprise different map excerpts of the map display. The two different map excerpts are characterized in terms of the disclosure in that neither of the map excerpts includes the other. This means that a non-empty difference quantity is defined for all map excerpts with respect to all other map excerpts. The two map excerpts here together constitute a coherent representation of data of the map display, which means that the component displays are generated such that the user can comprehend information from them and bring the information together to an overall picture, wherein the map excerpts illustrated together comprise information of a common, larger, map excerpt.

The two map excerpts are here in a geographical relationship to one another; they can, for example, adjoin each other at one side. The positions of the map excerpts, defined, for example, by their center point, can furthermore be offset with respect to one another. This geographical relationship of the map excerpts is determined on the basis of the relative arrangement of the first display surface 2*a* to the second display surface 2*b*. Thus if, as in the exemplary embodiment, the two display surfaces 2*a*, 2*b* are arranged laterally next to one another, the geographical relationship of the map excerpts in the example is determined such that the map excerpt of the right-hand display surface 2*b* is laterally adjacent to the right of the map excerpt of the display surface 2*a* arranged on the left.

The disclosed map excerpt further comprises the current position of the transportation vehicle 1 for precisely one determined display surface 2*c*. The display surface 2*c* determined, through which the position of the transportation vehicle 1 should be displayed, is determined on the basis of an operating mode of the transportation vehicle 1. The operating mode is captured here by the control unit 4 with reference to various parameters of the transportation vehicle as well as through a user input. Driving parameters can, for example, be captured, for example, a speed, acceleration or position of the transportation vehicle 1, as parameters of the transportation vehicle 1 for capturing the operating mode. A user input can, further, be captured and used to determine the operating mode. The current position of the transportation vehicle 1 is either displayed by the first display surface 2*a* or the second display surface 2*b* depending on the captured operating mode.

The map excerpts are thus formed such that the determined display surface 2*c* displays the current position and surroundings of the transportation vehicle 1, while the other display surface 2*d* displays the further surroundings, such as the periphery to the side of the transportation vehicle 1. In the illustrated example, the determined display surface 2*c* is determined on the basis of the operating mode. The other one of the display surfaces 2*a*, 2*b* is then the other display surface 2*d*.

Here the geographical relationship of the map excerpts to one another is unchanged, which means it is kept constant, so that when there is a change to a map excerpt, for example, because the transportation vehicle 1 moves along the road network, a change to the other map excerpt also results. The component displays for the two display surfaces 2*a*, 2*b* are here generated such that the user perceives a continuation of the display of the map excerpts by the two display surfaces 2*a*, 2*d*. The component displays can, for example, change during a curved movement of the transportation vehicle such that this impression of a continued view continues to remain, while, for example, rotation around the current position of the transportation vehicle 1 is displayed.

Figure 2A:
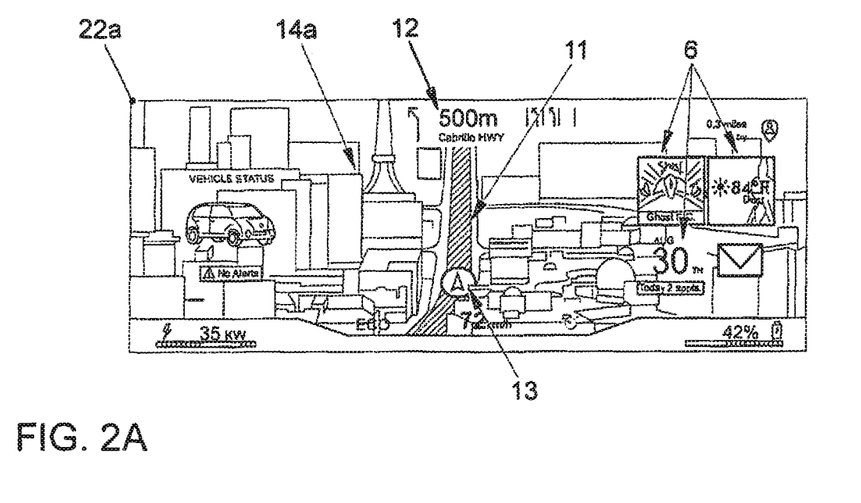
FIGS. 2A and 2B show component displays for an exemplary embodiment of the disclosed method.
Figure 2B:
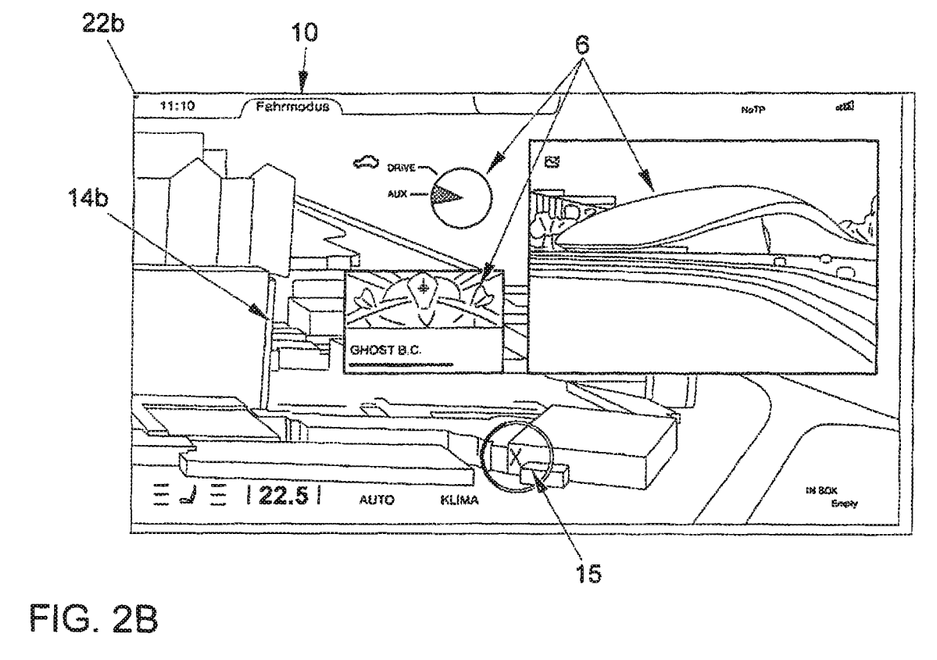

In the exemplary embodiment, the FIGS. 2A and 2B represent the case in which the first display surface in the instrument cluster of the transportation vehicle 1 has been determined on the basis of the operating mode as the determined display surface 2*c*, through which the map excerpt with the current position of the transportation vehicle 1 is output. In addition, the second display surface, here the center display, has been determined as the other display surface 2*d* through which map data of the periphery are displayed.

The first component display 22*a* comprises a map excerpt 14*a* with a current position 13 of the transportation vehicle 1. This is represented in the example as a graphical symbol with an arrow, wherein the direction of travel of the transportation vehicle is represented along a route 11. The representation of the route 11 is made as a path envelope 11. The map excerpt 14*a* is displayed three-dimensionally with perspective, in particular, comprising three-dimensional illustrations of buildings in the surroundings of the route 11. The first component display 22*a* further comprises a driving instruction 12; in the illustrated case, at a distance of 500 m, on turning to the left onto the Cabrillo Highway, the two left-hand lanes of three are to be available.

The first component display 22*a* further comprises application displays 6, which in the illustrated case are widgets 6. These are assigned to application programs of the computing unit 5; in particular, data relating to a temperature and to a piece of music currently being played are output. The first component display 22*a* can further comprise additional information, for example, relating to a transportation vehicle state and a driving state; in the illustrated case, for example, the speed of the transportation vehicle 1 is displayed.

The second component display 22*b*, illustrated in FIG. 2B comprises a further map excerpt 14*b* which represents a lateral, in this case local, continuation of the map excerpt 14*a* of the first component display 22*a*. Here again a three-dimensional display is provided, in particular, of buildings in the periphery of the travel route of the transportation vehicle 1 arranged laterally to the right. Widgets 6 are again displayed, typically comprising data relating to the operation of the transportation vehicle 1 and to multimedia contents, in particular, music, currently being played. An image, associated with the route, of an interesting sight is further displayed in association with the planned route.

In the exemplary embodiment, the second component display further comprises an operating mode display 10, wherein it is shown here that the "driving mode" is currently active. In the present case this means that the driver must give a high level of attention to the navigation along the route. Data relating to the navigation are therefore displayed in the instrument cluster in the direction of view of the driver, while a display of travel-related data is made in the second component display 22b on the center display. The center display 2b comprises a touch-sensitive surface as an input unit, where the second component display 22b comprises an operating surface 15 through which a changeover of the operating mode is enabled. An operating mode change signal is generated if the user actuates the operating surface 15. The control unit 4 thus registers that a different operating mode should be selected, wherein only two operating modes are defined in the illustrated example.

Figure 3A:
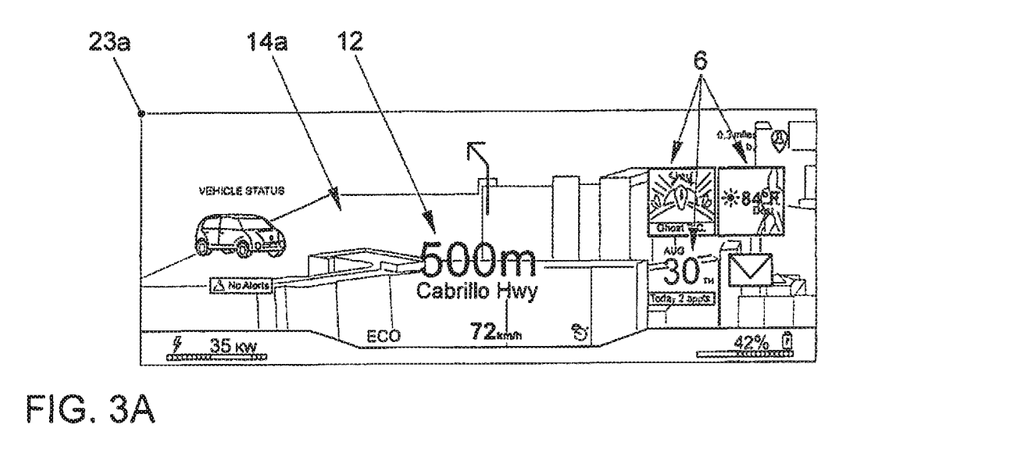
FIGS. 3A and 3B show examples of component displays for a further operating mode of the display system.
Figure 3B:
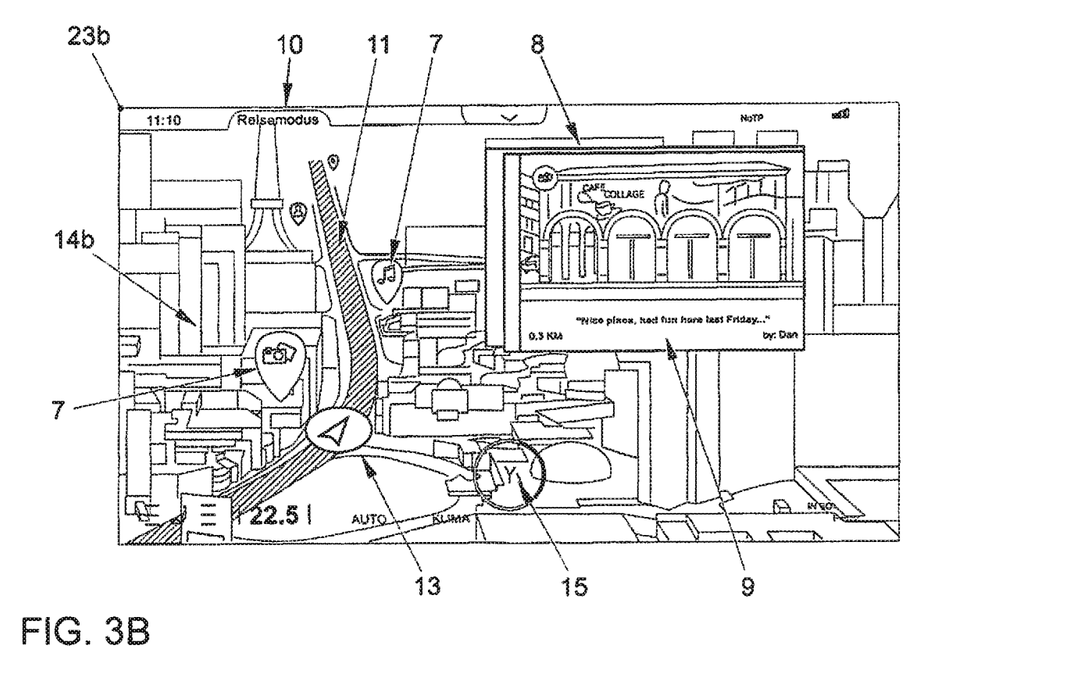

Component displays for a further operating mode of the display system are explained with reference to FIGS. 3A and 3B. The disclosed system and disclosed method as explained above with reference to FIGS. 1, 2A and 2B is assumed here.

The first component display 23a is output here by the instrument cluster with the first display surface 2a, while the second component display 23b is displayed by the second display surface 2b of the center display. The first component display 23a comprises the driving instruction 12 which is displayed in the example in the central region of the second component display 23a. It further comprises the map excerpt 14a, where a periphery of the planned travel route is displayed here. The first component display 23a further comprises widgets 6 for the display of application data.

The second component display 23b comprises the operating mode display 10 which, in this case, indicates that the "journey mode" is active as the operating mode. It comprises the map excerpt 14b with the current position 13 of the transportation vehicle 1 as well as intermediate destinations 7 along the route 11. In the illustrated exemplary embodiment, these are represented as drop-like symbols, which furthermore symbolizes what kind of contents are linked to the intermediate destinations 7. These can, for example, be multimedia contents which are linked to the location of the route; data of an address book or of another database with locations along the route, for example, can furthermore be linked. The second component display further comprises, in the illustrated example, an output from a different application from that defined for the driving mode. An intermediate destination display 8 is illustrated here, wherein this in particular comprises a rating text 9.

In the illustrated case, the user can use the intermediate destination display 8 to call up more detailed information about intermediate destinations 7 along the route 11. Image data and text data, as well as further multimedia contents, can here be linked to individual intermediate destinations 7. The data can be acquired from the Internet or a database. An operating action is defined here, through which the user can switch between different intermediate destinations 7, where browsing can be represented, wherein the nearest intermediate destinations 7 along the route 11 are illustrated one after another. In the journey mode a selection of the illustrated application data and widgets 6 is thus generated such that a route planning and information acquisition in association with the travel route is enabled.

The second component display 23b further comprises the operating surface 15, through the activation of which the user can switch into the driving mode.

A determination is made on the basis of the operating mode of the display system of which of the display surfaces the current position of the transportation vehicle 1 is output through. A situation-specific or operating-mode-specific selection of data displays of further applications of the computing unit 5 can further be generated on the basis of the operating mode, so that different data can be displayed in addition to the map excerpts depending on the operating mode.

In a further exemplary embodiment, the driving mode is acquired alternatively or in addition on the basis of the navigation data. In particular here, the driving instructions that the user should follow in the near future are registered; for example, whether a particularly large number of or particularly difficult driving maneuvers are to be carried out is taken into account. In particular here, the determined display surface 2c through which the current position of the transportation vehicle 1 is output is determined such that the driver can easily comprehend the position of the transportation vehicle 1 and the immediate surroundings in the map excerpt of the instrument cluster 2a.

LIST OF REFERENCE SIGNS

1 Transportation vehicle
2a First display surface; instrument cluster
2b Second display surface; center display
2c Determined display surface
2d Other display surface
3 Navigation device
4 Control unit
5 Computing unit
6 Application display; widget
7 Intermediate destination
8 Intermediate destination display
9 Rating text
10 Operating mode display
11 Route; path envelope
12 Driving instruction
13 Current position of the transportation vehicle (symbol)
14a, 14b Map excerpts
15 Operating surface
22a, 23a First component display
22b, 23b Second component display

The invention claimed is:

1. A method for operating a display system in a transportation vehicle having at least one first display surface and one second display surface, wherein the display surfaces are arranged spaced apart from one another, and the display system has a first and a second operating mode, the method comprising:

acquiring navigation data and generating a map display based on the acquired navigation data, wherein the map display comprises a current position of the transportation vehicle; and generating display data for at least one first component display and a second component display based on the map display, wherein the first component display is displayed by the first display surface, and the second component display is displayed by the second display surface, wherein the first component display comprises a first map excerpt, and the second component display comprises a second map excerpt, wherein the first and the second map excerpts comprise different excerpts of the map display, wherein the entirety of the two map excerpts forms a coherent representation of data of the map display, wherein the first and the second map excerpts have a geographical relationship with one another, wherein the geographical relationship between the first and second map excerpts is determined based on the relative arrangement of the first display surface to the second display surface and the arrangement of the display surfaces in the vehicle reflects the geographical relationship of the displayed map excerpts to one another, and wherein one of the at least two display surfaces is determined, and the map excerpt of the component display that is displayed by the determined display surface is formed so the map excerpt includes the current position of the transportation vehicle depending on the operating mode of the display system.

2. The method of claim 1, wherein an operating mode change signal is acquired and the first component display and the second component display are updated based on the operating mode change signal.

3. The method of claim 2, wherein the updated component displays are formed so the current position of the transportation vehicle is displayed by the display surface other than the display surface first determined.

4. The method of claim 2, wherein the operating mode change signal is detected based on a user input, wherein the user input comprises an actuation of an operating element or a gesture.

5. The method of claim 2, wherein the operating mode change signal is generated automatically based on driving parameters.

6. The method of claim 1, wherein application data are output through the at least two display surfaces, wherein the application data that are output are formed depending on the operating mode of the display system.

7. The method of claim 6, wherein the application data comprise a driving instruction.

8. The method of claim 1, wherein the first and second map excerpts are further determined depending on parameters of the movement of the transportation vehicle.

9. The method of claim 1, wherein the map display comprises a display of a route, wherein the display of the route comprises an elongated graphical element starting from the current position of the transportation vehicle.

10. The method of claim 1, wherein the map display comprises a two-dimensional or three-dimensional display.

11. A display system in a transportation vehicle, the display system comprising:

at least one first and one second display surface, wherein the display surfaces are spaced apart from one another, wherein the display system has a first and a second operating mode;

a navigation device through which navigation data is captured and a map display is generated based on the captured navigation data, wherein the map display includes a current position of the transportation vehicle; and a control unit through which display data for at least one first component display and one second component display is generated based on the map display, wherein the first component display is displayed by the first display surface, and the second component display is displayed by the second display surface, wherein the first component display comprises a first map excerpt and the second component display comprises a second map excerpt, wherein the first and the second map excerpt comprise different excerpts of the map display, wherein the entirety of the two map excerpts forms a coherent representation of the data of the map display, wherein the first and the second map excerpt have a geographical relationship with one another, wherein the geographical relationship between the first and second map excerpts is determined based on the relative arrangement of the first display surface to the second display surface and the arrangement of the display surfaces in the vehicle reflects the geographical relationship of the displayed map excerpts to one another, and wherein one of the at least two display surfaces is determined, and the map excerpt of the component display that is displayed by the determined display surface is formed so the map excerpt includes the current position of the transportation vehicle depending on the operating mode of the display system.

12. The display system of claim 11, wherein application data is generated by a computing unit, and the application data is output depending on the operating mode by the at least two display surfaces.

13. The display system of claim 11, wherein the first and the second display surface are arranged in fixed positions in the transportation vehicle.

14. The display system of claim 11, wherein the display surfaces are arranged laterally in relation to one another.

15. The display system of claim 11, wherein the display surfaces are comprised of a center display, an infotainment screen and/or an instrument cluster of the transportation vehicle.

* * * * *